(12) United States Patent
Luo et al.

(10) Patent No.: US 11,327,939 B2
(45) Date of Patent: May 10, 2022

(54) METHOD AND DEVICE FOR INDEXING DIRTY DATA IN STORAGE SYSTEM PAGE

(71) Applicant: ZTE CORPORATION, Guangdong (CN)

(72) Inventors: Shengmei Luo, Guangdong (CN); Jiwu Shu, Guangdong (CN); Youyou Lu, Guangdong (CN); Hongzhang Yang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 544 days.

(21) Appl. No.: 16/481,077

(22) PCT Filed: Jan. 24, 2018

(86) PCT No.: PCT/CN2018/073967
§ 371 (c)(1),
(2) Date: Jul. 26, 2019

(87) PCT Pub. No.: WO2018/149278
PCT Pub. Date: Aug. 23, 2018

(65) Prior Publication Data
US 2019/0370238 A1    Dec. 5, 2019

(30) Foreign Application Priority Data
Feb. 14, 2017 (CN) .......................... 201710080651.X

(51) Int. Cl.
*G06F 16/22* (2019.01)
*G06F 12/0868* (2016.01)
*G06F 12/0882* (2016.01)
*G06F 12/0804* (2016.01)

(52) U.S. Cl.
CPC ...... *G06F 16/2237* (2019.01); *G06F 12/0804* (2013.01); *G06F 12/0868* (2013.01); *G06F 12/0882* (2013.01)

(58) Field of Classification Search
CPC ............ G06F 16/2237; G06F 12/0804; G06F 12/0868; G06F 12/0882
See application file for complete search history.

(56) References Cited

U.S. PATENT DOCUMENTS 9,053,027 B1 *  6/2015  Harvey ............... G06F 11/14
2006/0123200 A1 *  6/2006  Ito ................... G06F 12/0804
                                                711/143

* cited by examiner

*Primary Examiner* — Charles Rones
*Assistant Examiner* — Hewy H Li

(57) ABSTRACT

A method for indexing dirty data in a storage system page includes: obtaining a point quantity of storage points in the storage page and dirty data distribution information; creating a bitmap based on the point quantity and dirty data distribution information; creating an extended segment set based on the dirty data distribution information, and obtaining the number of current extended segments in the extended segment set; obtaining, according to the point quantity, a first storage cost for indexing dirty data using the bitmap in the target storage page; obtaining, according to the number of current extended segments and the segment capacity, a second storage cost for indexing dirty data using the extended segments in the target storage page; and determine, according to the first storage cost and the second storage cost, to index the dirty data in the target storage page by means of the bitmap or the extended segments.

19 Claims, 7 Drawing Sheets

METHOD AND DEVICE FOR INDEXING DIRTY DATA IN STORAGE SYSTEM PAGE

FIELD OF THE INVENTION

The present application relates to, but is not limited to, the technical field of storage devices.

BACKGROUND OF THE INVENTION

Solid State Drive (SSD) is a hard disk manufactured with solid-state electronic memory chips and consists of a control unit and a storage unit. For example, the storage unit is a flash chip, a dynamic random access memory (which is referred to as DRAM for short) chip, or the like. The specifications and definitions, the function, and the usage method about an interface of the SSD are exactly the same as those of the ordinary hard disk. Product appearance and size of the SSD are also identical to those of the ordinary hard disk. The SSD is widely used due to its features such as high read and write bandwidth, low access latency, and low power consumption.

The flash-based SSD adopts the flash translation layer (which is referred to as FTL for short) to manage read, write and erase of the flash memory, and provides the software system the same read and write interfaces as that of a magnetic disk. The flash translation layer (FTL) mainly comprises three functions of address mapping, garbage collection, and wear leveling.

Inside the SSD, a flash chip package is connected to a flash controller through different channels. In the flash chip package, a plurality of flash dies is packaged, and each of the dies can execute instructions independently. Each die contains multiple flash planes, each of which has separate registers that provide execution of pipelined instructions among the multiple flash planes. The SSD may provide sufficient access bandwidth with concurrency of different levels, and such a feature is known as internal concurrency of the flash memory device.

SUMMARY OF THE INVENTION

The following is an overview of the subject matters described in detail herein. This overview is not intended to limit the scope of the claims.

The present disclosure provides a method and a device for indexing dirty data in a storage system page so that an amount of write data is reduced during performing of writing operations in the storage system and latency of synchronous operations is reduced, thereby improving the performance of the storage system.

A method for indexing dirty data in a storage system page, comprising:

obtaining a point quantity of storage points in a target storage page in the storage system, and obtaining dirty data distribution information of the dirty data in each storage point in the target storage page;

creating a bitmap on the basis of the point quantity and the dirty data distribution information;

creating a set of extended segments on the basis of the dirty data distribution information, and obtaining the number of current extended segments and a segment capacity of a extended segment in the set of extended segments;

obtaining, according to the point quantity, a first storage cost for indexing the dirty data using the bitmap in the target storage page;

obtaining, according to the number of the current extended segments and the segment capacity, a second storage cost for indexing the dirty data using the extended segments in the target storage page; and determining, according to the first storage cost and the second storage cost, whether to index the dirty data in the target storage page by means of the bitmap or the extended segments.

Alternatively, obtaining the point quantity of the storage points in the target storage page in the storage system and obtaining the dirty data distribution information of the dirty data in each storage point in the target storage page comprises:

obtaining a page capacity of the target storage page in the storage system and a point capacity of the storage point in the target storage page, deriving the point quantity of the storage points according to the page capacity and the point capacity, and then obtaining the dirty data distribution information of the dirty data in each storage point in the target storage page;

wherein, when the storage point is of the dirty data, a corresponding data bit of the storage point in the bitmap is of a positive identifier; when the storage point is not of the dirty data, the corresponding data bit of the storage point in the bitmap is of negative identifier; and one extended segment in the set of extended segments corresponds to one dirty data segment in the target storage page, each extended segment comprising an offset sub-segment and a length sub-segment; and obtaining the segment capacity of the extended segment in the set of extended segments comprises:

deriving the segment capacity of the extended segment according to the number of data bits of the offset sub-segment and the length sub-segment.

Alternatively, determining, according to the first storage cost and the second storage cost, whether to index the dirty data in the target storage page by means of the bitmap or the extended segments comprises:

indexing the dirty data in the target storage page by means of the bitmap when the first storage cost is less than the second storage cost; and indexing the dirty data in the target storage page by means of the extended segments when the second storage cost is less than the first storage cost.

Alternatively, determining, according to the first storage cost and the second storage cost, whether to index the dirty data in the target storage page by means of the bitmap or the extended segments comprises:

obtaining a first query cost for indexing the dirty data using the bitmap in the target storage page; obtaining a second query cost for indexing the dirty data using the extended segments in the target storage page based on the number of the current extended segments;

deriving, according to the first storage cost and the first query cost, a first total cost for indexing the dirty data using the bitmap in the target storage page; deriving, according to the second storage cost and the second query cost, a second total cost for indexing the dirty data using the extended segments in the target storage page; and when the first total cost is less than the second total cost, indexing the dirty data in the target storage page by means of the bitmap; and when the second total cost is less than the first total cost, indexing the dirty data in the target storage page by means of the extended segments.

Alternatively, deriving, according to the first storage cost and the first query cost, the first total cost for indexing the dirty data using the bitmap in the target storage page comprises:

deriving, according to a preset formula, the first storage cost and the first query cost, the first total cost for indexing the dirty data using the bitmap in the target storage page; and deriving, according to the second storage cost and the second query cost, the second total cost for indexing the dirty data using the extended segments in the target storage page comprises:

deriving, according to the preset formula, the second storage cost and the second query cost, the second total cost for indexing the dirty data using the extended segments in the target storage page, wherein, the preset formula is Cost=p*Storage+q*Query, in which Cost is a total cost; p is a first preset coefficient; Storage is a storage cost; q is a second preset coefficient; Query is a query cost; and p+q=1, and wherein, the larger the storage capacity of the storage system is, the smaller p is, and the smaller the storage capacity of the storage system is, the larger p is.

Alternatively, after creating the set of extended segments on the basis of the dirty data distribution information and obtaining the number of the current extended segments and the segment capacity the extended segment in the set of extended segments, the method further comprises:

updating, when update of the dirty data distribution information is detected, data in the offset sub-segment and the length sub-segment of each extended segment in the set of extended segments; and based on the updated offset sub-segment and the updated length sub-segment of each extended segment, merging each extended segment with another where the extended segments sharing intersections are merged into one new extended segment, and using the number of merged extended segments in the set of extended segments as the new number of the current extended segments.

A device for indexing dirty data in a storage system page, comprising:

an obtaining module (10) configured to obtain a point quantity of storage points in a target storage page in the storage system, and obtain dirty data distribution information of the dirty data in each storage point in the target storage page;

a bitmap creating module (20) configured to create a bitmap on the basis of the point quantity and the dirty data distribution information obtained by the obtaining module (10);

an extended segment creating module (30) configured to create a set of extended segments on the basis of the dirty data distribution information obtained by the obtaining module (10), and to obtain the number of current extended segments and a segment capacity of a extended segment in the set of extended segments;

a cost obtaining module (40) configured to obtain, according to the point quantity obtained by the obtaining module (10), a first storage cost for indexing the dirty data using the bitmap in the target storage page, and obtain, and to obtain, according to the number of the current extended segments and the segment capacity obtained by the extended segment creating module (30), a second storage cost for indexing the dirty data using the extended segments in the target storage page; and an indexing module (50) configured to determine, according to the first storage cost and the second storage cost obtained by the cost obtaining module (40), whether to index the dirty data in the target storage page by means of the bitmap or the extended segments.

Alternatively, the obtaining module (10) is configured to:

obtain a page capacity of the target storage page in the storage system and a point capacity of the storage points in the target storage page, derive the point quantity of the storage points according to the page capacity and the point capacity, and then obtain the dirty data distribution information of the dirty data in each storage point in the target storage page;

wherein, when the storage point is of the dirty data, a corresponding data bit of the storage point in the bitmap is of a positive identifier; when the storage point is not of the dirty data, the corresponding data bit of the storage point in the bitmap is of negative identifier; and one extended segment in the set of extended segments corresponds to one dirty data segment in the target storage page, each extended segment comprising an offset sub-segment and a length sub-segment; and the extended segment creating module (30) obtaining the segment capacity of the extended segment in the set of extended segments comprises: deriving the segment capacity of the extended segment according to the number of data bits of the offset sub-segment and the length sub-segment.

Alternatively, the indexing module (50) is configured to:

index the dirty data in the target storage page by means of the bitmap when the first storage cost is less than the second storage cost; and index the dirty data in the target storage page by means of the extended segments when the second storage cost is less than the first storage cost.

Alternatively, the indexing module (50) comprises:

a first obtaining unit (51) configured to obtain a first query cost for indexing the dirty data using the bitmap in the target storage page, and obtain, based on the number of the current extended segments, a second query cost for indexing the dirty data using the extended segments in the target storage page;

a second obtaining unit (52) configured to derive, according to the first storage cost obtained by the cost obtaining module (40) and the first query cost obtained by the first obtaining unit (51), a first total cost for indexing the dirty data using the bitmap in the target storage page and derive, and to derive, according to the second storage cost obtained by the cost obtaining module (40) and the second query cost obtained by the first obtaining unit (51), a second total cost for indexing the dirty data using the extended segments in the target storage page; and an indexing unit (53) configured to index the dirty data in the target storage page by means of the bitmap when the first total cost obtained by the second obtaining unit (52) is less than the second total cost, and to index the dirty data in the target storage page by means of the extended segments when the second total cost obtained by the second obtaining unit (52) is less than the first total cost.

Alternatively, the second obtaining unit (52) is configured to:

derive, according to a preset formula, the first storage cost and the first query cost, the first total cost for indexing the dirty data using the bitmap in the target storage page; and derive, according to the preset formula, the second storage cost and the second query cost, the second total cost for indexing the dirty data using the extended segments in the target storage page, wherein, the preset formula is Cost=p*Storage+q*Query, in which Cost is a total cost; p is a first preset coefficient; Storage is a storage cost; q is a second preset coefficient;

Query is a query cost; and p+q=1, and wherein, the larger the storage capacity of the storage system is, the smaller p is, and the smaller the storage capacity of the storage system is, the larger p is.

Alternatively, the extended segment creating module (30) is further configured to:

update, when update of the dirty data distribution information is detected, data in the offset sub-segment and the length sub-segment of each extended segment in the set of extended segments; and merge, based on the updated offset sub-segment and the length sub-segment of each extended segment, each extended segment with another where the extended segments sharing intersections are merged into one new extended segment, and use the number of merged extended segments in the set of extended segments as the new number of the current extended segments.

A computer readable storage medium on which computer executable instructions are stored, wherein when the computer executable instructions are executed by a processor, the method for indexing dirty data in a storage system page according to any of the above is achieved.

In the method and device for indexing dirty data in a storage system page according to the embodiment of the present disclosure, the first storage cost for indexing the dirty data using the bitmap and the second storage cost for indexing the dirty data using the extended segments in the target storage page in the current storage system are obtained, and whether to index the dirty data in the target storage page by means of the bitmap or the extended segments is determined based on the first storage cost and the second storage cost. As a result, the dirty data is updated and indexed with the smaller granularity of the bitmap or the extended segments, and is stored in a cache. When the cache is almost full (i.e., the cache is greater than a preset cache value), the dirty data is written back to an external storage or a flash memory in terms of a granularity of the storage page so as to avoid writing a whole storage pages to the flash memory device when only a small portion of the storage pages is written (i.e., there are few the dirty data segments in the storage pages). Therefore, the amount of write data is reduced; the latency of the synchronous operations is reduced; the performance of the system is indirectly improved; and the wear of the flash memory device is also reduced, thereby the service life of the flash memory device is improved.

Other aspects will be apparent upon reading and understanding the drawings and detailed description.

DETAILED DESCRIPTION OF THE EMBODIMENTS

Hereinafter, embodiments of the present disclosure will be described in detail with reference to the accompanying drawings.

Steps illustrated in the flowchart of the accompanying drawings may be executed in a computer system, such as in accordance with a set of computer executable instructions. Further, although a logical order is shown in the flowchart, in some cases, the steps shown or described may be executed in a different order from the ones defined herein.

It is understood that the alternative embodiments and alternative implementations described herein are merely illustrative of the embodiments of the disclosure, but are not limited thereto.

In a file system (i.e., a storage system), a page cache (that is, a storage page of the storage system) is used to cache recently operated data to speed up the read and write process. When data is read, first is to find, in the page cache, whether content of the data has resided in the memory. If the content is found, the data is directly returned and expensive device operations are no need to be active; if not, then reading of the data is performed in the flash memory. When performing writing operation, the data is no longer written into a flash memory device, but into the page cache with marking a corresponding page as dirty, and then operation of return is performed. When the user launches synchronous calls or when the operating system background thread initiates synchronous operations, the dirty marked pages in the page cache are written to the flash memory device.

In the above writing operation mode, one writing operation involves one page (that is, one storage page), and the page as a whole is marked as dirty, all of which will be written into the flash memory device later, even though the present writing operation only involves a small portion of the page. As a result, the amount of write data is largely increased, and not only the latency of the synchronous operations is increased, the performance of the file system or the storage system is degraded, but wear of the flash memory device is also increased which shortens the service life thereof greatly.

Figure 1:
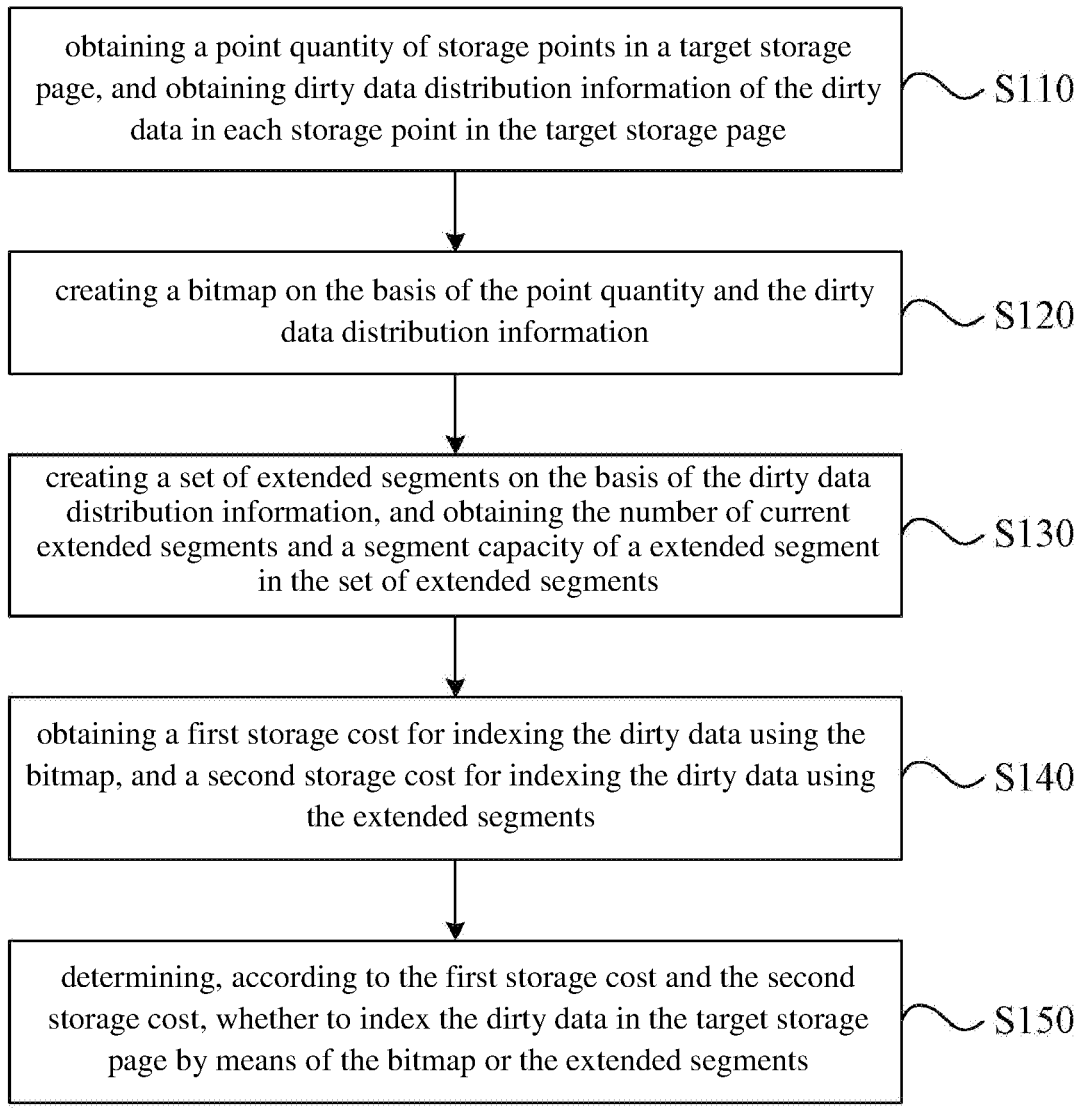
FIG. 1 is a flow chart of a method for indexing dirty data in a storage system page according to an embodiment of the present disclosure.

As shown in FIG. 1, in the flow chart of a method for indexing dirty data in a storage system page according to an embodiment of the present disclosure, the method for indexing dirty data in a storage system page provided by the embodiment of the present disclosure may include the steps of, i.e., S110~S150:

S110, a point quantity of storage points in a target storage page in the storage system is obtained, and dirty data distribution information of the dirty data in each storage point in the target storage page is obtained.

Alternatively, in an embodiment of the present disclosure, S110 may be implement as that: a page capacity of a target storage page in the storage system and a point capacity of a storage point in the target storage page are obtained, then the point quantity of the storage points is derived according to the page capacity and the point capacity, and thus the dirty data distribution information of the dirty data in each storage point in the target storage page is obtained.

The storage system may include a plurality of storage pages. The method for indexing dirty data in a storage system page provided by the embodiment of the present disclosure may be applicable to each storage page, and the method for indexing dirty data in a storage system page provided by the embodiment of the present disclosure will be explained by using a certain storage page as the target storage page. In addition, the form of recording the dirty data by the storage system is not specified before the method and device for indexing dirty data in the storage system page provided by the embodiment of the present disclosure is applied to the storage system. The form may be the above described form of recording the dirty data with the whole storage page, or may be the form of recording the dirty data with the bitmap or extended segments as mentioned in the embodiment of the present disclosure. No matter which form of recording the dirty data is adopted, the page capacity of the target storage page in the storage system and the point capacity of the storage point in the target storage page in the storage system may be obtained, then the point quantity of the storage points may be derived according to the page capacity and the point capacity, and thus the dirty data distribution information of the dirty data in each storage point in the target storage page may be obtained.

For example, if the page capacity of the target storage page in the storage system is 4 KB, and the point capacity of the storage point in the target storage page is 8 B (1 B equals to 1 byte, and 1 byte equals to 8 bits), then the point quantity of the storage points is 512 (4 KB/8 B=512). That is, the target storage page has 512 storage points which are orderly distributed. The dirty data distribution information includes the locations of the storage points where the dirty data exists (if the 512 storage points are numbered orderly, the number index of the storage point corresponds to the location of this storage point) and the location of the data bit where the dirty data exists in the target storage page (for example, the page capacity of the storage page is 4 KB, i.e., the storage page includes 32*1024 data bits, the number index of the data bit corresponds to the location of the data bit of the dirty data).

S120, a bitmap is created on the basis of the quantity of the storage points and the dirty data distribution information. One data bit in the bit map corresponds to one storage point of the target storage page. When a storage point is of the dirty data, a corresponding data bit of the storage point in the bitmap is of a positive identifier, and when the storage point is not of the dirty data, the corresponding data bit thereof in the bitmap is of negative identifier.

A bitmap may be a sequence of data bits used to record whether the data in the storage page is of a data structure of the dirty data or not. For example, in an embodiment of the present disclosure, the smallest unit for update of the storage page is the storage point. One storage page is composed of a plurality of storage points. One storage point defaults to be 8 B (bytes) and the storage point capacity may be adjusted. The data bits of the bitmap are in form of bit, and each bit of the bitmap corresponds to one storage point in the storage page. A bit in the bitmap can only be of 0 or 1. That is, the positive identifier of the data bit is of 1, and the negative identifier thereof is of 0. 0 indicates that the storage point corresponding to this bit is clean (has not been updated), and 1 indicates that the storage point corresponding to this bit is dirty (has been updated).

Figure 2:
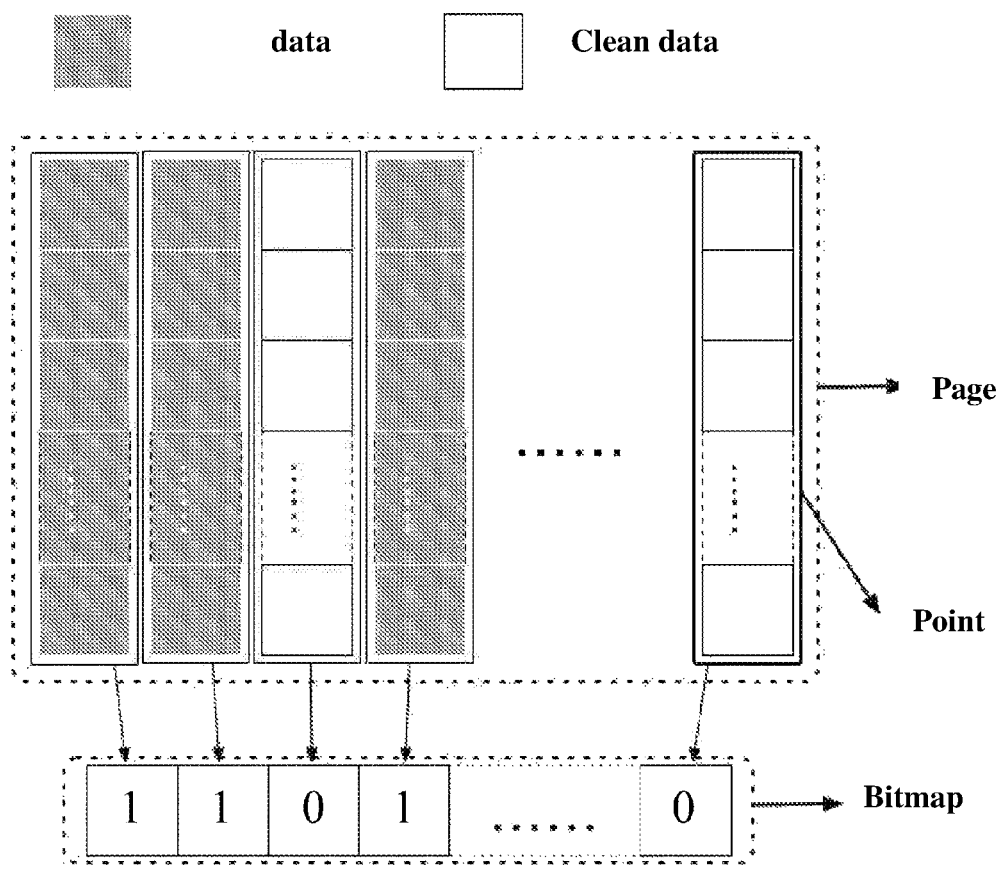
FIG. 2 is a schematic diagram of a scenario for creating and updating a bitmap in the method for indexing dirty data in a storage system page according to the embodiment of the present disclosure.

FIG. 2 is a schematic diagram of a scenario for creating and updating a bitmap in the method for indexing dirty data in a storage system page according to an embodiment of the present disclosure. With reference to FIG. 2, the value of a bit (i.e., data bit) in the bitmap is of 0 or 1. 0 indicates that the storage point corresponding to the bit is clean (has not been updated), and 1 indicates that the storage point corresponding to the bit is dirty (has been updated). The size of the bitmap will not be changed. If a storage point is updated, its corresponding bit in the bitmap is then set to be 1, and the setting operation may be ignored if the corresponding bit is already of 1. When the bitmap is created, the bitmap is allocated with a space of a fixed capacity, the size of which may be the capacity of the storage page divided by the capacity of the storage point, and then the bitmap is updated according to merged expanded segments. For example, the corresponding bits in the gray part of FIG. 2 are all set to be 1.

In addition, if the data in the target storage page had just been updated, but power was cut off right before the corresponding bits (i.e., data bits) in the bitmap were set to 1, then the location where the data has been written in log area of the storage system may be checked, and then whether the corresponding bit value of the bitmap is of 1 or not may be check. If the value is 1, ignores this operation; else if, the value is set to be 1. When the dirty data is to be indexed in the target data page, the bitmap is scanned to find all the data of the locations of the storage points corresponding to the value 1.

S130, a set of extended segments is created on the basis of the dirty data distribution information, and the number of current extended segments and a segment capacity of an extended segment in the set of extended segments are obtained, wherein one extended segment in the set of extended segments corresponds to one dirty data segment in the target storage page. Each extended segment includes an offset sub-segment and a length sub-segment, and the segment capacity of the extended segment may be derived according to the number of data bits of the offset sub-segment and the length sub-segment.

The extended segment including the offset sub-segment and the length sub-segment indicates that the extended segment has two attributes: offset (Offset) and len (length). The extended segment <offset, len> indicates the segment that has been data-updated. Offset indicates an offset of a start position of the extended segment relative to a base address 0 which is the address of the start address of the extended segment. Len indicates the length of the extended segment. Since the extended segment is a continuous segment, these two attributes determine the location of the extended segment in the storage page.

With reference to the above example in which the page capacity of the target storage page in the storage system is 4 KB, each attribute in the extended segment occupies 10 bits. That is, the offset sub-segment and the length sub-segment of one extended segment each occupies 10 bits (i.e., 10 data bits), and each extended segment occupies 20 bits.

S140, according to the quantity of the points, a first storage cost for indexing the dirty data using the bitmap in the target storage page is obtained, and then, according to the number of the current extended segments and the segment capacity, a second storage cost for indexing the dirty data using the extended segments in the target storage page is obtained S150, according to the first storage cost and the second storage cost, whether to index the dirty data in the target storage page by means of the bitmap or the extended segments is determined.

Similarly, with reference to the above example in which the page capacity of the target storage page in the storage system is 4 KB and the target storage page has 512 storage points which are orderly distributed, then the storage bitmap is of 512 bits. If each attribute of the extended segment occupies 10 bits and the extended segment has two attributes (that is, each extended segment occupies 20 bits, i.e., the segment capacity of a current extended segment is of 20 bit), and if the number of the current extended segments is set to be N while the number of the current extended segments is equal to the number of the current dirty data segments, then the set of storage extended segments is of 20N bits. That is, in this example, the first storage cost is of 512 bits, and the second storage cost is of 20N bits.

Figure 3:
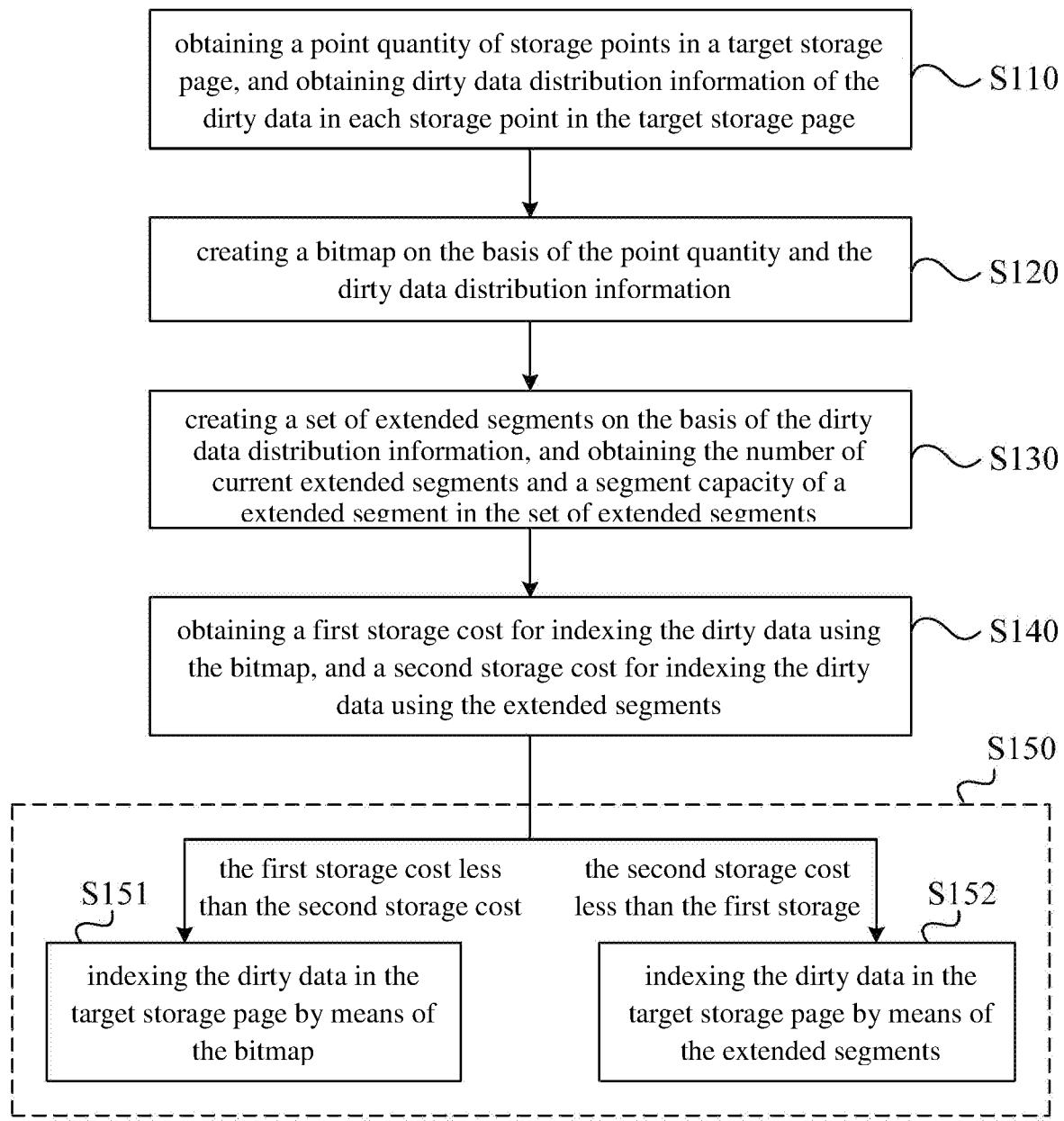
FIG. 3 is a flow chart of another method for indexing dirty data in a storage system page according to an embodiment of the present disclosure.

Alternatively, FIG. 3 is a flow chart of another method for indexing dirty data in a storage system page according to an embodiment of the present disclosure. On the basis of the embodiment shown in FIG. 1, S150 shown in the embodiment of FIG. 3 may be implemented as including the steps of, i.e., S151~S152:

S151, when the first storage cost is less than the second storage cost, indexing of the dirty data in the target storage page is performed by means of the bitmap; and S152, when the second storage cost is less than the first storage cost, indexing of the dirty data in the target storage page is performed by means of the extended segments.

In an embodiment of the present disclosure, in principle, on one hand, when the number of the current extended segments reaches 26, that is, when the second storage cost is of 520 bits, the second storage cost is greater than the first storage cost (512 bits), then more space may be saved if indexing by means of the bitmap. On the other hand, when the number of the current extended segments is less than 26, that is, when the second storage cost is less than 500 bits, the second storage cost is less than the first storage cost (512 bits), then more space may be saved if indexing by means of the extended segments. In addition, when the dirty data is concentrated, plenty of dirty data may be indexed with one extended segment, which means that a more space-saving way to record is by means of the extended segments. When the dirty data is not concentrated, a capacity of the dirty data indexed by one extended segment may be larger than a capacity occupied by the extended segment itself, which means that a more space-saving to record is by means of the bitmap at this time.

In an embodiment of the present disclosure, the first storage cost for indexing the dirty data using the bitmap and the second storage cost for indexing the dirty data using the extended segments in the target storage page in the current storage system are obtained, and then whether to index the dirty data in the target storage page by means of the bitmap or the extended segments is determined based on the first storage cost and the second storage cost. As a result, the dirty data is updated and indexed with the smaller granularity of the bitmap or the extended segments, and is stored in a cache. When the cache is almost full (i.e., the cache is greater than a preset cache value), the dirty data is written back to an external storage or a flash memory in terms of a granularity of the storage page so as to avoid writing a whole storage page into the flash memory device when only a small portion of the storage pages is written (i.e., there are few dirty data segments in the storage pages). Therefore, the amount of write data is reduced; the latency of the synchronous operations is reduced; the performance of the system is indirectly improved; the wear of the flash memory device is also reduced, and the service life of the flash memory device is improved. Further, in an embodiment of the present disclosure, determination, according to the first storage cost and the second storage cost, of whether to index the dirty data in the target storage page by means of the bitmap or the extended segments is achieved so as to flexibly save the capacity consumption of the storage system during indexing of the dirty data.

Figure 4:
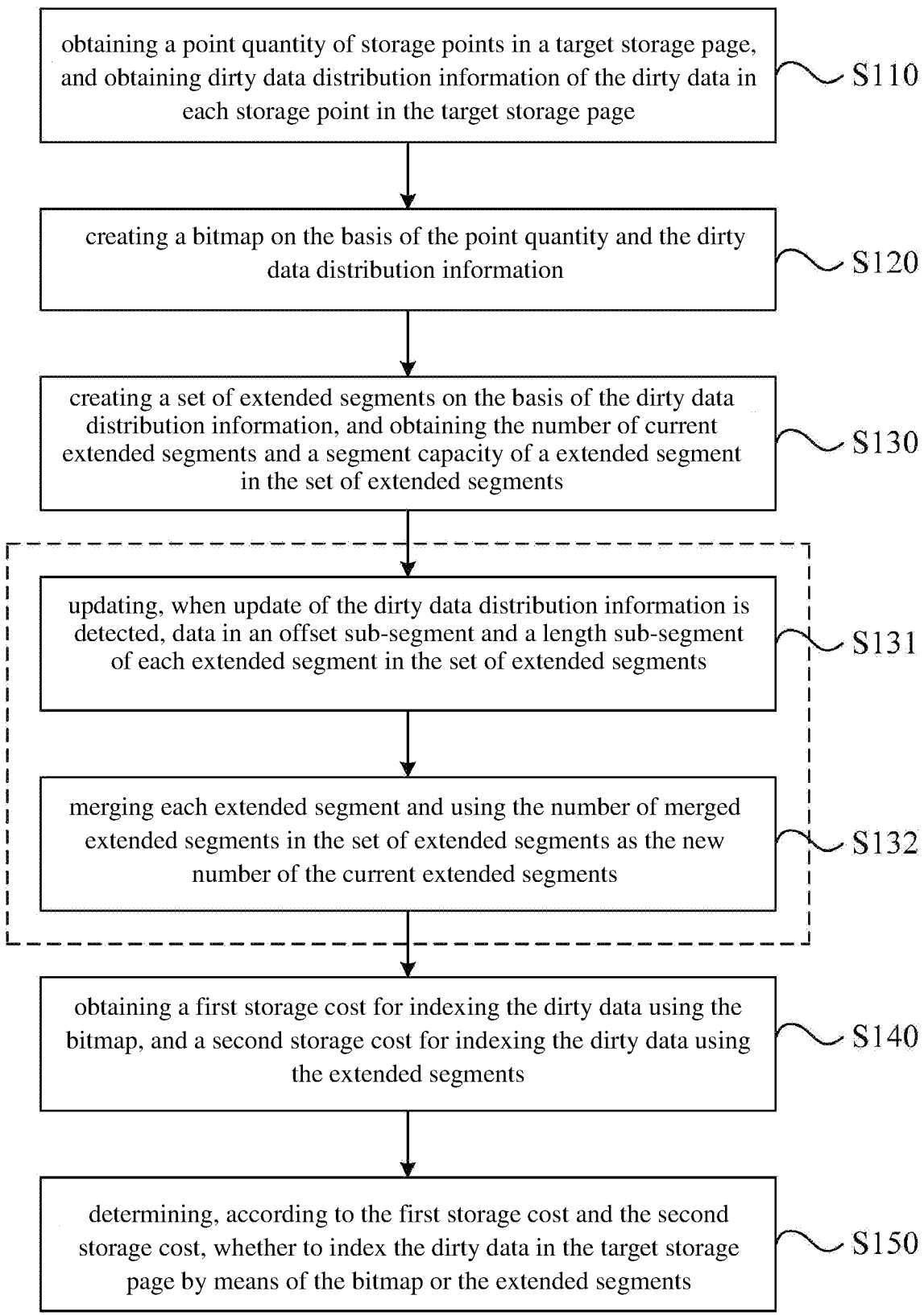
FIG. 4 is a flow chart of yet another method for indexing dirty data in a storage system page according to an embodiment of the present disclosure.

Alternatively, FIG. 4 is a flow chart of yet another method for indexing dirty data in a storage system page according to an embodiment of the present disclosure. On the basis of the embodiment shown in FIG. 1, steps after S130 shown in the embodiment of FIG. 4 may include the steps of, i.e., S131~S132:

S131, when update of the dirty data distribution information is detected, data in the offset sub-segment and the length sub-segment of each extended segment in the set of extended segments are updated; and S132, based on the updated offset sub-segment and the length sub-segment of each extended segment, merging is performed to each of the extended segments so that the extended segments sharing intersections are merged into one new extended segment, and then the number of merged extended segments in the set of extended segments is used as the new number of the current extended segments.

In an embodiment of the present disclosure, when the update of the dirty data distribution information is detected, if there is a plurality of extended segments, first is to merge the extended segments where the merging is carried out between two of a pair of extended segments. As to two extended segments <offset1, len1> and <offset2, len2> (wherein, offset2>=offset1), first is to determine whether offset2−offset1 is greater than len1. If offset2−offset1 is greater than len1, the merging result is <offset1, len1>+ <offset2, len2>; else if offset2−offset1 is equal to len1, the merging result is <offset1, len1+len2>; and else if offset2− offset1 is less than len1, then it is further to determine whether len1−(offset2−offset1) is greater than or equal to len2. If len1−(offset2−offset1) is greater than or equal to len2, the merging result is <offset1, len1>; if not, then the merging result is <offset1, len2+(offset2−offset1)>.

Figure 5:
FIG. 5 is a schematic diagram of a scenario for merging extended segments in the method for indexing dirty data in a storage system page according to an embodiment of the present disclosure.
Figure 5:
Figure 5:
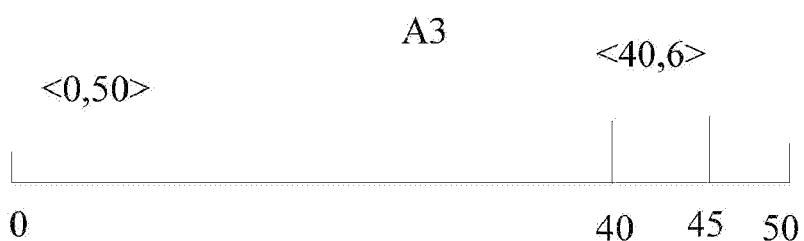
Figure 5:
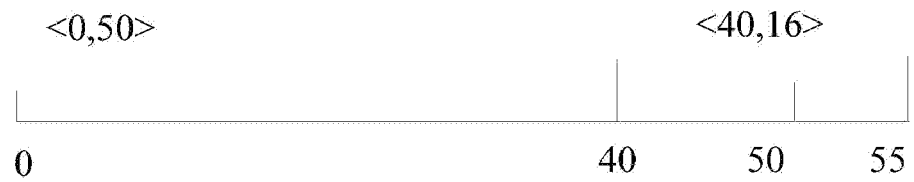

Hereinafter, an example will be described for understanding the merging process of the extended segments. FIG. 5 is a schematic diagram of a scenario for merging the extended segments in the method for indexing dirty data in a storage system page according to an embodiment of the present disclosure. With reference to A1 in FIG. 5, the first extended segment <offset1, len1> is <0, 50>. If <offset2, len2> is <51, 10>, then offset2>offset1 and offset2−offset1>len1 (i.e., (51−0)>50), the merging result is thus <offset1, len1>+ <offset2, len2> (i.e., <0, 50>+<51, 10>). If <offset2, len2> is <50, 6>, with reference to A2 in FIG. 5, then offset2− offset1=len1 (i.e., (50−0)=50), and the merging result is thus <offset1, len1+len2> (i.e., <0, 56>). If <offset2, len2> is <40, 6>, with reference to A3 in FIG. 5, offset2− offset1<len1 (i.e., (40−0)<50), then len1−(offset2−offset1) is further calculated as len1−(offset2−offset1)=50−(40−0)=10, such that len1−(offset2−offset1)>len2=6, and the merging result is thus <offset1, len1> (i.e., <0, 50>). If <offset2, len2> is <40, 16>, with reference to A4 in FIG. 5, offset2− offset1<len1 (i.e., (40−0)<50), then len1−(offset2−offset1) is further calculated as len1−(offset2−offset1)=50−(40−0)=10, such that len1−(offset2−offset1)<len2=16, and the merging result is thus <offset1, len2+offset2−offset1)> (i.e., <0, 16+(40−0)>, that is, <0, 56>).

Figure 6:
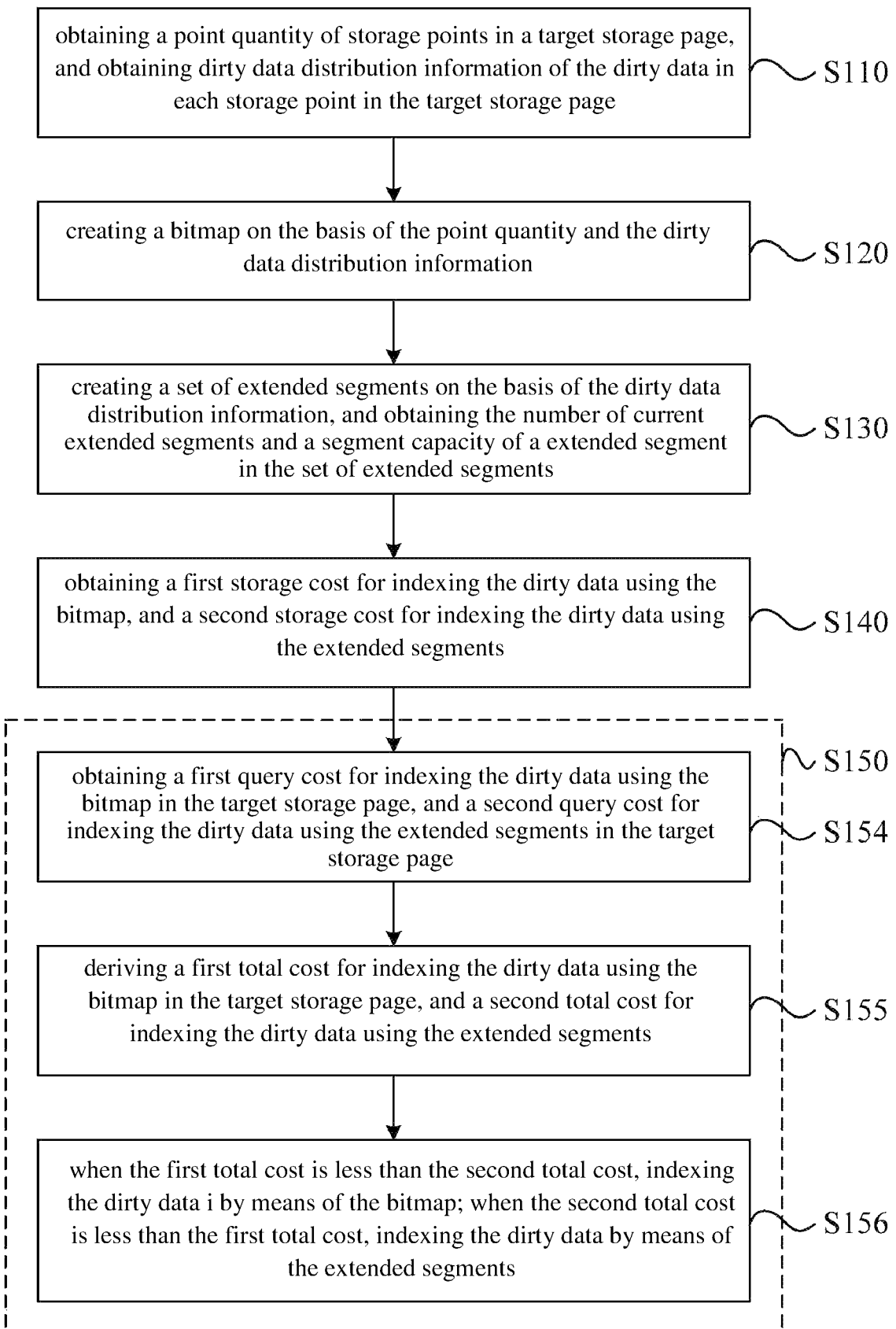
FIG. 6 is a flow chart of yet still another method for indexing dirty data in a storage system page according to an embodiment of the present disclosure.

Alternatively, FIG. 6 is a flow chart of yet still another method for indexing dirty data in a storage system page according to an embodiment of the present disclosure. On the basis of the embodiment shown in FIG. 1, S150 shown in the embodiment of FIG. 6 may include the steps of, i.e., S154~S156:

S154, a first query cost for indexing the dirty data using the bitmap in the target storage page is obtained; a second query cost for indexing the dirty data using the extended segments in the target storage page is obtained based on the number of the current extended segments;

S155, a first total cost for indexing the dirty data using the bitmap in the target storage page is derived based on the first storage cost and the first query cost; and a second total cost for indexing the dirty data using the extended segments in the target storage page is derived based on the second storage cost and the second query cost; and S156, when the first total cost is less than the second total cost, the dirty data in the target storage page is indexed by means of the bitmap; and when the second total cost is less than the first total cost, the dirty data in the target storage page is indexed by means of the extended segments.

Similarly, with reference to the above example in which the page capacity of the target storage page in the storage system is 4 KB, the capacity of the storage point is 8 B, the storage bitmap is thus of 512 bits; the first storage cost may be of 512 units; and an index complexity of the bitmap is O(1). If the extended segment set includes n extended segments, the set of storage extended segments is of 20 n bits, and the index complexity of the extended segment is O(n/2). As a result, the first query cost for indexing the dirty data using the bitmap is of 1 unit, and the first storage cost may be of 512 bits. The second query cost for indexing the dirty data using the extended segments is of n units, and the second storage cost may be of 20 n units. Therefore, the index complexity of indexing by the bitmap is O(1), and the index complexity of indexing by the extended segment is O(n). In consideration of the total cost, it may be determined that when the number of the extended segments (i.e., n) is less than or equal to 20, the index information of the dirty data is stored by means of the extended segments; and when the number of the extended segments (i.e., n) is greater than 20, the index information of the dirty data is stored by means of the bitmap.

In an embodiment of the present disclosure, the factor of the query cost of the bitmap and the extended segments are further considered, and whether the dirty data in the target storage page is indexed by means of the bitmap or the extended segments is selected based on the total cost derived from the storage cost and the query cost. In this way, the index of the dirty data in the target storage page strikes a balance between the indexing speed and the occupied storage space, making the dirty data indexing in the storage system more stable and balanced. Therefore, when the dirty data is concentrated, it is more space-saving to record by means of the extended segments, and when the dirty data is not concentrated, it is more space-saving to record by means of the bitmap. Further, finding with the bitmap is quicker than finding with the extended segments. As such, in the embodiments of the present disclosure, the indexing method to be used is adjusted according to actual situations, and dynamic adjustment of the indexing method based on dirty block distribution is achieved so that whether the data in the page is dirty data or not can be indexed with very low expense.

Alternatively, in an embodiment of the present disclosure, S155 may be implemented as comprising the steps of:

the first total cost for indexing the dirty data using the bitmap is derived from the target storage page according to a preset formula, the first storage cost and the first query cost; and the second query cost, the second total cost for indexing the dirty data using the extended segments is derived from the target storage page according to the preset formula, the second storage cost and;

wherein, the preset formula is Cost=p*Storage+q*Query, in which Cost is a total cost; p is a first preset coefficient; Storage is a storage cost; q is a second preset coefficient; Query is a query cost; and p+q=1, wherein the larger the storage capacity of the storage system is, the smaller p is, and the smaller the storage capacity of the storage system is, the larger p is.

With reference to the example of the above S156, under the assumption that the capacity of the storage page is 4 KB and the capacity of the storage point is 8 B, then the bitmap stored is thus of 512 bits. Further, under the assumption that each attribute of the extended segment occupies 10 bits and the extended segment has two attributes (offset and length), then each extended segment occupies 20 bits. In principle, when the number of the extended segments reaches 26, it is more space-saving using the bitmap, and when the number of the extended segments is less than 26, it is more space-saving using the extended segments. However, the index complexity of the bitmap is O(1) and the index complexity of the extended segments is O(n). In consideration of a total cost, the storage cost (recorded as Storage) and the query cost (recorded as Query) are weighed by p and q, respectively, and the obtained total cost (recorded as Cost) is shown in the following expression:

$$Cost=p\cdot Storage+q\cdot Query$$

wherein, when n extended segments are used, the value of Storage (i.e., the second storage cost) is 20n/(512+20n), and the value of the Query (i.e., the second query cost) is (n/2)/(1+n/2); and when the bitmap is used, the value of Storage (i.e., the first storage cost) is 512/(512+20n), and the value of the Query (i.e., the first query cost) is 1/(1+n/2). When p is 0.4 and q is 0.6 (the ratio is determined based on the actual situation of the storage system, if the storage space of the storage system is small, the value of p is intended to be larger, and if not, the value of p is intended to be smaller), it is tested that when the number n of the extended segments is less than 14, Cost (i.e., the second total cost) is smaller if recording of the dirty data information using the extended segments; and when the number n of the extended segments is greater than or equal to 14, cost (i.e., the first total cost) is smaller if recording of the dirty data using the bitmap. As a result, in the present embodiment, not only the information of the dirty data in an SSD (Solid State Drive) can be stored with a fixed-size storage area, but also whether the data of the storage page in the SSD is dirty data or not can be indexed with very low expense and much quick speed.

Figure 7:
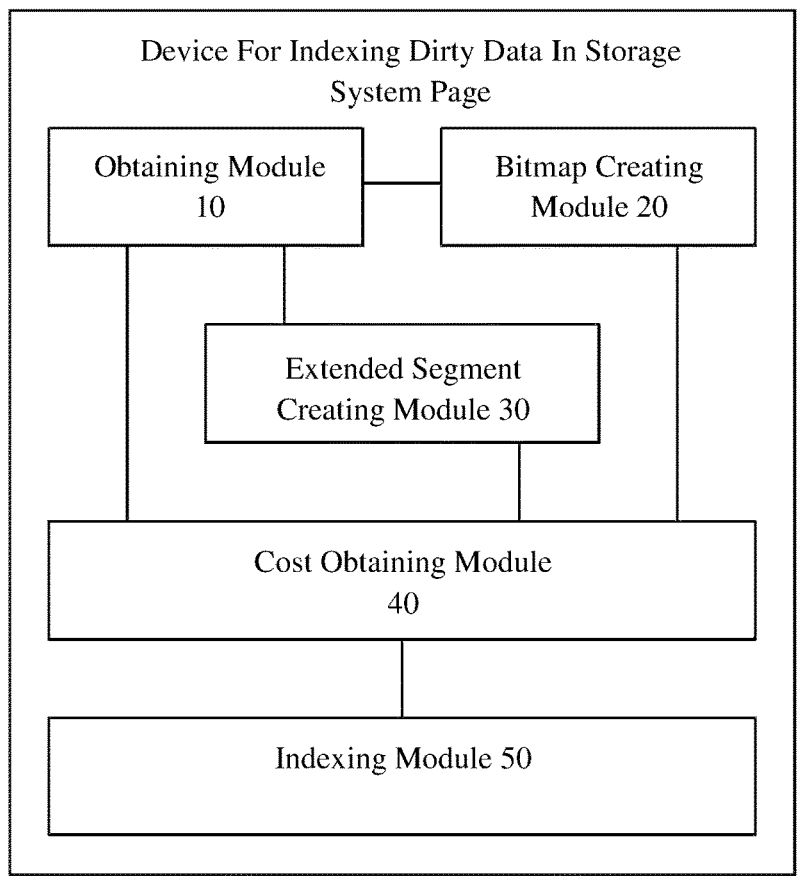
FIG. 7 is a schematic diagram of a structure of a device for indexing dirty data in a storage system page according to an embodiment of the present disclosure.

As shown in FIG. 7, in the schematic diagram of a structure of a device for indexing dirty data in a storage system page according to an embodiment of the present disclosure, the device for indexing dirty data in a storage system page provided by the embodiment of the present disclosure may include:

an obtaining module 10, which is configured to obtain the point quantity of storage points in a target storage page in the storage system, and obtain dirty data distribution information of the dirty data in each storage point in the target storage page.

Alternatively, in an embodiment of the present disclosure, the obtaining module 10 is configured to: obtain a page capacity of a target storage page in the storage system and a point capacity of a storage points in the target storage page, derive the point quantity of the storage points based on the page capacity and the point capacity, and obtain the dirty data distribution information of the dirty data in each storage point in the target storage page.

The storage system may include a plurality of storage pages. The method for indexing dirty data in a storage system page provided by the embodiment of the present disclosure may be applicable to each storage page, and the device for indexing dirty data in a storage system page provided by the embodiment of the present disclosure will be explained using a certain storage page as the target storage page. In addition, the form of recording the dirty data by the storage system is not specified before the method and device for indexing dirty data in the storage system page provided by the embodiment of the present disclosure is applied to the storage system. The form may be the above described form of recording the dirty data with the whole storage page, or may be the form of recording the dirty data with the bitmap or extended segments as mentioned in the embodiment of the present disclosure. No matter which form of recording the dirty data is adopted, the obtaining module 10 may obtain the page capacity of the target storage page in the storage system and the point capacity of the storage point in the target storage page, then derive the point quantity of the storage points according to the page capacity and the point capacity, and thus obtain the dirty data distribution information of the dirty data in each storage point in the target storage page.

For example, if the page capacity of the target storage page in the storage system is 4 KB, and the point capacity of the storage point in the target storage page is 8 B (1B equals to 1 byte, and 1 byte equals to 8 bits), then the point quantity of the storage points is 512 (4 KB/8 B=512). That is, the target storage page has 512 storage points which are orderly distributed. The dirty data distribution information includes the locations of the storage points where the dirty data exists (if the 512 storage points are numbered orderly, the number index of the storage point corresponds to the location of this storage point) and the location of the data bit where the dirty data exists in the target storage page (for example, the page capacity of the storage page is 4 KB, i.e., the storage page includes 32*1024 data bits, the number index of the data bit corresponds to the location of the data bit of the dirty data).

A bitmap creating module 20 is configured to create a bitmap on the basis of the quantity of the points and the dirty data distribution information obtained by the obtaining module 10, wherein one data bit in the bit map corresponds to one storage point of the target storage page. When a storage point is of the dirty data, a corresponding data bit of the storage point in the bitmap is of a positive identifier, and when the storage point is not of the dirty data, the corresponding data bit thereof in the bitmap is of negative identifier.

A bitmap may be a sequence of data bits used to record whether the data in the storage page is of a data structure of the dirty data or not. For example, in an embodiment of the present disclosure, the smallest unit for update of the storage page is the storage point. One storage page is composed of a plurality of storage points. One storage point defaults to be 8 B (bytes) and the storage point capacity may be adjusted. The data bits of the bitmap are in form of bit, and each bit of the bitmap corresponds to one storage point in the storage page. A bit in the bitmap can only be of 0 or 1. That is, the positive identifier of the data bit is of 1 and the negative identifier thereof is of 0. 0 indicates that the storage point corresponding to this bit is clean (has not been updated), and 1 indicates that the storage point corresponding to this bit is dirty (has been updated).

With reference to the schematic diagram for creating and updating a bitmap shown in FIG. 2, the value of a bit (i.e., data bit) in the bitmap is of 0 or 1. 0 indicates that the storage point corresponding to the bit is clean (has not been updated), and 1 indicates that the storage point corresponding to the bit is dirty (has been updated). The size of the bitmap will not be changed. If a storage point is updated, its corresponding bit in the bitmap is then set to be 1, and the setting operation may be ignored if the corresponding bit is already of 1. When the bitmap is created, the bitmap is allocated with a space of a fixed capacity, the size of which may be the capacity of the storage page divided by the capacity of the storage point, and then the bitmap is updated according to merged expanded segments. For example, the corresponding bits in the gray part of FIG. 2 are all set to be 1.

In addition, if the data in the target storage page had just been updated, but power was cut off right before the corresponding bits (i.e., data bits) in the bitmap were set to 1, then the location where the data has been written in log area of the storage system may be checked, and then whether the corresponding bit value of the bitmap is of 1 or not may be check. If the value is 1, ignores this operation; else if, the value is set to be 1. When the dirty data is to be indexed in the target data page, the bitmap is scanned to find all the data of the locations of the storage points corresponding to the value 1.

An extended segment creating module 30 is configured to create an extended segment set on the basis of the dirty data distribution information obtained by the obtaining module 10, and obtain the number of current extended segments and a segment capacity of an extended segments in the set of extended segments, wherein one extended segment in the set of extended segments corresponds to one dirty data segment in the target storage page. Each extended segment includes an offset sub-segment and a length sub-segment, and the segment capacity of the extended segment may be derived according to the number of data bits of the offset sub-segment and the length sub-segment.

The extended segment including the offset sub-segment and the length sub-segment indicates that the extended segment has two attributes: offset (Offset) and len (length). The extended segment <offset, len> indicates the segment that has been data-updated. Offset indicates an offset of a start position of the extended segment relative to a base address 0 which is the address of the start address of the extended segment. Len indicates the length of the extended segment. Since the extended segment is a continuous segment, these two attributes determine the location of the extended segment in the storage page.

With reference to the above example in which the page capacity of the target storage page in the storage system is 4 KB, each attribute in the extended segment occupies 10 bits. That is, the offset sub-segment and the length sub-segment of one extended segment each occupies 10 bits (i.e., 10 data bits), and each extended segment occupies 20 bits.

An cost obtaining module 40 is configured to obtain, according to the quantity of the points obtained by the obtaining module 10, a first storage cost for indexing the dirty data using the bitmap in the target storage page, and obtain, according to the number of the current extended segments and the segment capacity obtained by the extended segment creating module 30, a second storage cost for indexing the dirty data using the extended segments in the target storage page.

An indexing module 50 is configured to determine, according to the first storage cost and the second storage cost obtained by the cost obtaining module 40, whether to index the dirty data in the target storage page by means of the bitmap or the extended segments.

Similarly, with reference to the above example in which the page capacity of the target storage page in the storage system is 4 KB, and the target storage page has 512 storage points which are orderly distributed, and the storage bitmap is of 512 bits. If each attribute of the extended segment occupies 10 bits and the extended segment has two attributes (that is, each extended segment occupies 20 bits, i.e., the segment capacity of a current extended segment is of 20 bit), and if the number of the current extended segments is set to be N while the number of the current extended segments is equal to the number of the current dirty data segments, then the set of storage extended segments is of 20N bits. That is, in this example, the first storage cost is of 512 bits, and the second storage cost is of 20N bits.

Alternatively, in the embodiment of the present disclosure, the indexing module 50 is configured to: when the first storage cost is less than the second storage cost, indexing of the dirty data in the target storage page is performed by means of the bitmap; and when the second storage cost is less than the first storage cost, indexing of the dirty data in the target storage page is performed by means of the extended segments.

In an embodiment of the present disclosure, in principle, on one hand, when the number of the current extended segments reaches 26, that is, when the second storage cost is of 520 bits, the second storage cost is greater than the first storage cost (512 bits), then more space may be saved if indexing by means of the bitmap. On the other hand, when the number of the current extended segments is less than 26, that is, when the second storage cost is less than 500 bits, the second storage cost is less than the first storage cost (512 bits), then more space may be saved if indexing by means of the extended segments. In addition, when the dirty data is concentrated, plenty of dirty data may be indexed with one extended segment, which means that a more space-saving way to record is by means of the extended segments. When the dirty data is not concentrated, a capacity of the dirty data indexed by one extended segment may be larger than a capacity occupied by the extended segment itself, which means that a more space-saving to record is by means of the bitmap at this time.

In an embodiment of the present disclosure, the first storage cost for indexing the dirty data using the bitmap and the second storage cost for indexing the dirty data using the extended segments in the target storage page in the current storage system are obtained by the cost obtaining module 40, and then whether to index the dirty data in the target storage page by means of the bitmap or the extended segments is determined based on the first storage cost and the second storage cost by the indexing module 50. As a result, the dirty data is updated and indexed with the smaller granularity of the bitmap or the extended segments, and is stored in a cache. When the cache is almost full (i.e., the cache is greater than a preset cache value), the dirty data is written back to an external storage or a flash memory in terms of a granularity of the storage page so as to avoid writing a whole storage page into the flash memory device when only a small portion of the storage pages is written (i.e., there are few dirty data segments in the storage pages). Therefore, the amount of write data is reduced; the latency of the synchronous operations is reduced; the performance of the system is indirectly improved; the wear of the flash memory device is also reduced, and the service life of the flash memory device is improved. Further, in an embodiment of the present disclosure, determination, according to the first storage cost and the second storage cost, of whether to index the dirty data in the target storage page by means of the bitmap or the extended segments is achieved so as to flexibly save the capacity consumption of the storage system during indexing of the dirty data.

Alternatively, in an embodiment of the present disclosure, the extended segment creating module 30 is further configured to: when update of the dirty data distribution information is detected, update data in the offset sub-segment and the length sub-segment of each extended segment in the set of extended segments;

based on the updated offset sub-segment and the length sub-segment of each extended segment, merging is performed to each of the extended segments so that the extended segments sharing intersections are merged into one new extended segment, and then the number of merged extended segments in the set of extended segments is used as the new number of the current extended segments.

In an embodiment of the present disclosure, when the update of the dirty data distribution information is detected, if there is a plurality of extended segments, first is to merge the extended segments where the merging is carried out between two of a pair of extended segments. As to two extended segments <offset1, len1> and <offset2, len2> (wherein, offset2>=offset1), first is to determine whether offset2−offset1 is greater than len1. If offset2−offset1 is greater than len1, the merging result is <offset1, len1>+ <offset2, len2>; else if offset2−offset1 is equal to len1, the merging result is <offset1, len1+len2>; and else if offset2− offset1 is less than len1, then it is further to determine whether len1−(offset2−offset1) is greater than or equal to len2. If len1−(offset2−offset1) is greater than or equal to len2, the merging result is <offset1, len1>; if not, the merging result is <offset1, len2+(offset2−offset1)>.

Hereinafter, an example will be described for understanding the merging process of the extended segments. With reference to A1 in FIG. 5, the first extended segment <offset1, len1> is <0, 50>. If <offset2, len2> is <51, 10>, then offset2>offset1 and offset2−offset1>len1 (i.e., (51−0) >50), the merging result is thus <offset1, len1>+<offset2, len2> (i.e., <0, 50>+<51, 10>). If <offset2, len2> is <50, 6>, with reference to A2 in FIG. 5, then offset2−offset1=len1 (i.e., (50−0)=50), and the merging result is thus <offset1, len1+len2> (i.e., <0, 56>). If <offset2, len2> is <40, 6>, with reference to A3 in FIG. 5, offset2−offset1<len1 (i.e., (40− 0)<50), then len1−(offset2−offset1) is further calculated as len1−(offset2−offset1)=50−(40−0)=10, such that len1−(offset2−offset1)>len2=6, and the merging result is thus <offset1, len1> (i.e., <0, 50>). If <offset2, len2> is <40, 16>, with reference to A4 in FIG. 5, offset2−offset1<len1 (i.e., (40−0)<50), then len1−(offset2−offset1) is further calculated as len1−(offset2−offset1)=50−(40−0)=10, such that len1− (offset2−offset1)<len2=16, and the merging result is thus <offset1, len2+(offset2−offset1)> (i.e., <0, 16+(40−0)>, that is, <0, 56>).

Figure 8:
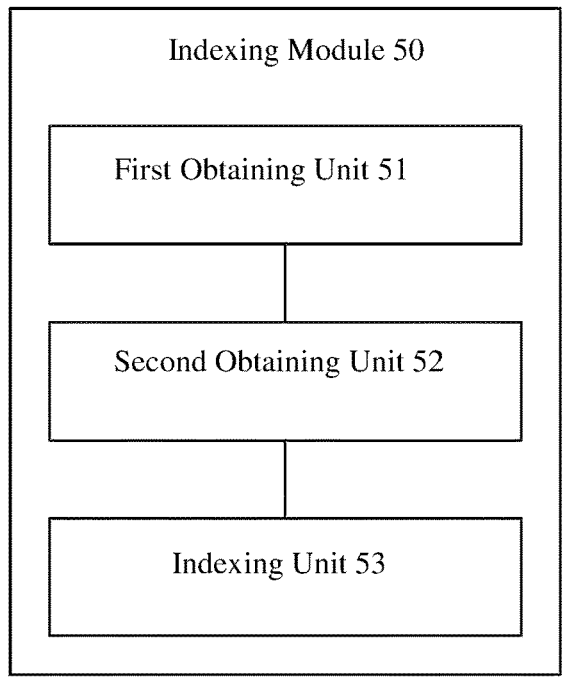
FIG. 8 is a schematic diagram of a structure of an indexing module in the device for indexing dirty data in a storage system page according to an embodiment of the present disclosure.

Alternatively, FIG. 8 is a schematic diagram of a structure of an indexing module in the device for indexing dirty data in a storage system page according to an embodiment of the present disclosure. As shown in FIG. 8, the indexing module 50 of the embodiment of the present disclosure may include:

a first obtaining unit 51 which is configured to obtain a first query cost for indexing the dirty data using the bitmap in the target storage page and obtain a second query cost for indexing the dirty data using the extended segments in the target storage page based on the number of the current extended segments;

a second obtaining unit 52 which is configured to derive, according to the first storage cost obtained by the cost obtaining module 40 and the first query cost obtained by the first obtaining unit 51, a first total cost for indexing the dirty data using the bitmap in the target storage page, and to derive, according to the second storage cost obtained by the cost obtaining module 40 and the second query cost obtained by the first obtaining unit 51, a second total cost for indexing the dirty data using the extended segments by the target storage page; and an indexing unit (53) which is configured to index the dirty data in the target storage page by means of the bitmap when the first total cost obtained by the second obtaining unit 52 is less than the second total cost, and to index the dirty data in the target storage page by means of the extended segments when the second total cost obtained by the second obtaining unit 52 is less than the first total cost.

Similarly, with reference to the above example in which the page capacity of the target storage page in the storage system is 4 KB, the capacity of the storage point is 8 B, the storage bitmap is thus of 512 bits; the first storage cost may be of 512 units; and an index complexity of the bitmap is $O(1)$. If the extended segment set includes n extended segments, the set of storage extended segments is of 20n bits, and the index complexity of the extended segment is $O(n/2)$. As a result, the first query cost for indexing the dirty data using the bitmap is of 1 unit, and the first storage cost may be of 512 bits. The second query cost for indexing the dirty data using the extended segments is of n units, and the second storage cost may be of 20n units. Therefore, the index complexity of indexing by the bitmap is $O(1)$, and the index complexity of indexing by the extended segment is $O(n)$. In consideration of the total cost, it may be determined that when the number of the extended segments (i.e., n) is less than or equal to 20, the index information of the dirty data is stored by means of the extended segments; and when the number of the extended segments (i.e., n) is greater than 20, the index information of the dirty data is stored by means of the bitmap.

In an embodiment of the present disclosure, the factor of the query cost of the bitmap and the extended segments are further considered, and whether the dirty data in the target storage page is indexed by means of the bitmap or the extended segments is selected based on the total cost derived from the storage cost and the query cost. In this way, the index of the dirty data in the target storage page strikes a balance between the indexing speed and the occupied storage space, making the dirty data indexing in the storage system more stable and balanced. Therefore, when the dirty data is concentrated, it is more space-saving to record by means of the extended segments, and when the dirty data is not concentrated, it is more space-saving to record by means of the bitmap. Further, finding with the bitmap is quicker than finding with the extended segments. As such, in the embodiments of the present disclosure, the indexing method to be used is adjusted according to actual situations, and dynamic adjustment of the indexing method based on dirty block distribution is achieved so that whether the data in the page is dirty data or not can be indexed with very low expense.

Alternatively, in an embodiment of the present disclosure, the second obtaining unit 52 is configured to:

derive, according to a preset formula, the first storage cost and the first query cost, the first total cost for indexing the dirty data using the bitmap in the target storage page; and derive, according to the preset formula, the second storage cost and the second query cost, the second total cost for indexing the dirty data using the extended segments in the target storage page, wherein, the preset formula is Cost=p*Storage+q*Query, in which Cost is a total cost; p is a first preset coefficient; Storage is a storage cost; q is a second preset coefficient; Query is a query cost; and p+q=1, wherein the larger the storage capacity of the storage system is, the smaller p is, and the smaller the storage capacity of the storage system is, the larger p is.

With reference to the example of the above indexing unit 53, under the assumption that the capacity of the storage page is 4 KB and the capacity of the storage point is 8 B, then the bitmap stored is thus of 512 bits. Further, under the assumption that each attribute of the extended segment occupies 10 bits and the extended segment has two attributes (offset and length), then each extended segment occupies 20 bits. In principle, when the number of the extended segments reaches 26, it is more space-saving using the bitmap, and when the number of the extended segments is less than 26, it is more space-saving using the extended segments. However, the index complexity of the bitmap is $O(1)$ and the index complexity of the extended segments is $O(n)$. In consideration of a total cost, the storage cost (recorded as Storage) and the query cost (recorded as Query) are weighed by p and q, respectively, and the obtained total cost (recorded as Cost) is shown in the following expression:

$$Cost = p \cdot Storage + q \cdot Query;$$

wherein, when n extended segments are used, the value of Storage (i.e., the second storage cost) is $20n/(512+20n)$, and the value of the Query (i.e., the second query cost) is $(n/2)/(1+n/2)$; and when the bitmap is used, the value of Storage (i.e., the first storage cost) is $512/(512+20n)$, and the value of the Query (i.e., the first query cost) is $1/(1+n/2)$. When p is 0.4 and q is 0.6 (the ratio is determined based on the actual situation of the storage system, if the storage space of the storage system is small, the value of p is intended to be larger, and if not, the value of p is intended to be smaller), it is tested that when the number n of the extended segments is less than 14, Cost (i.e., the second total cost) is smaller if recording of the dirty data information using the extended segments; and when the number n of the extended segments is greater than or equal to 14, cost (i.e., the first total cost) is smaller if recording of the dirty data using the bitmap. As a result, in the present embodiment, not only the information of the dirty data in an SSD (Solid State Drive) can be stored with a fixed-size storage area, but also whether the data of the storage page in the SSD is dirty data or not can be indexed with very low expense and much quick speed.

The embodiment of the present disclosure also provides a computer readable storage medium on which computer executable instructions are stored. When the computer executable instructions are executed by a processor, the method for indexing dirty data in a storage system page according to any embodiment as shown in FIGS. 1, 3, 4 and 6 may be achieved. The implementation of the computer readable storage medium provided by the embodiment of the present disclosure is similar to the method for indexing dirty data in a storage system page provided by the above described embodiments of the present disclosure, the description of which will be omitted.

Those of ordinary skill in the art will appreciate that all or some of the steps in the method and functional modules/units in the system and device disclosed above may be implemented as software, firmware, hardware, and suitable combinations thereof. In a hardware implementation, the division between functional modules/units mentioned in the above description does not necessarily correspond to the division of physical components. For example, one physical component may have multiple functions, or one single function or step may be performed cooperatively by several physical components. Some or all of the components may be implemented as software executed by a processor, such as a digital signal processor or microprocessor, or as hardware, or as an integrated circuit, such as an application specific integrated circuit. Such software may be distributed on a computer readable medium, which may include a computer storage medium (or non-transitory medium) and a communication medium (or transitory medium). As is well known to those of ordinary skill in the art, the term computer storage medium includes volatile and nonvolatile, removable and non-removable medium implemented in any method or technology for storing information (such as computer readable instructions, data structures, program modules or other data). The computer storage medium includes, but is not limited to, RAM, ROM, EEPROM, flash memory or other memory technology, CD-ROM, digital versatile disk (DVD) or other optical disk storage, magnetic cassette, magnetic tape, magnetic disk storage, or other magnetic storage device, or any other medium that may be used to store the desired information and may be accessed by the computer. In addition, as is well known to those of ordinary skill in the art, the communication medium typically includes computer readable instructions, data structures, program modules or other data in a modulated data signal such as a carrier wave or other transmission mechanism, and may include any information delivery medium.

The above description is only an alternative embodiment and an optional implementation of the present disclosure, and is not intended to limit the protective scope of the embodiments of the present disclosure. Various modifications and variations may be made to the embodiments of the present disclosure for those of ordinary skill in the art. Any modifications, equivalent substitutions, improvements are intended to be included within the protective scope of the present disclosure, as long as they are within the spirit and scope of the present disclosure.

INDUSTRIAL APPLICABILITY

In an embodiment of the present disclosure, a first storage cost for indexing the dirty data using the bitmap and a second storage cost for indexing the dirty data using the extended segments in the target storage page in the current storage system are obtained, and then whether to index the dirty data in the target storage page by means of the bitmap or the extended segments is determined based on the first storage cost and the second storage cost. As a result, the dirty data is updated and indexed with the smaller granularity of the bitmap or the extended segments, and is stored in a cache. When the cache is almost full (i.e., the cache is greater than a preset cache value), the dirty data is written back to an external storage or a flash memory in terms of a granularity of the storage page so as to avoid writing a whole storage pages into the flash memory device when only a small portion of the storage pages is written (i.e., there are few the dirty data segments in the storage pages). Therefore, the amount of write data is reduced; the latency of the synchronous operations is reduced; the performance of the system is indirectly improved; the wear of the flash memory device is also reduced, and the service life of the flash memory device is improved. Further, in an embodiment of the present disclosure, indexing the dirty data in the target storage page by means of the bitmap or the extended segments can flexibly save the capacity consumption of the storage system during indexing of the dirty data.

What is claimed is:

1. A method for indexing dirty data in a storage system page, comprising:
 obtaining a point quantity of storage points in a target storage page in the storage system, and obtaining dirty data distribution information of the dirty data in each storage point in the target storage page;
 creating a bitmap on the basis of the point quantity and the dirty data distribution information;
 creating a set of extended segments on the basis of the dirty data distribution information, and obtaining the number of current extended segments and a segment capacity of a extended segment in the set of extended segments;
 obtaining, according to the point quantity, a first storage cost for indexing the dirty data using the bitmap in the target storage page;
 obtaining, according to the number of the current extended segments and the segment capacity, a second storage cost for indexing the dirty data using the extended segments in the target storage page; and
 determining, according to the first storage cost and the second storage cost, whether to index the dirty data in the target storage page by means of the bitmap or the extended segments.

2. The method for indexing dirty data in the storage system page of claim 1, wherein obtaining the point quantity of the storage points in the target storage page in the storage system and obtaining the dirty data distribution information of the dirty data in each storage point in the target storage page comprises:
 obtaining a page capacity of the target storage page in the storage system and a point capacity of the storage point in the target storage page, deriving the point quantity of the storage points according to the page capacity and the point capacity, and then obtaining the dirty data distribution information of the dirty data in each storage point in the target storage page;
 wherein, when the storage point is of the dirty data, a corresponding data bit of the storage point in the bitmap is of a positive identifier; when the storage point is not of the dirty data, the corresponding data bit of the storage point in the bitmap is of a negative identifier; and one extended segment in the set of extended segments corresponds to one dirty data segment in the target storage page, each extended segment comprising an offset sub-segment and a length sub-segment; and
 obtaining the segment capacity of the extended segment in the set of extended segments comprises:
 deriving the segment capacity of the extended segment according to the number of data bits of the offset sub-segment and the length sub-segment.

3. The method for indexing dirty data in the storage system page of claim 1, wherein determining, according to the first storage cost and the second storage cost, whether to index the dirty data in the target storage page by means of the bitmap or the extended segments comprises:
   indexing the dirty data in the target storage page by means of the bitmap when the first storage cost is less than the second storage cost; and
   indexing the dirty data in the target storage page by means of the extended segments when the second storage cost is less than the first storage cost.

4. The method for indexing dirty data in the storage system page of claim 3, wherein after creating the set of extended segments on the basis of the dirty data distribution information and obtaining the number of the current extended segments and the segment capacity the extended segment in the set of extended segments, the method further comprises:
   updating, when update of the dirty data distribution information is detected, data in the offset sub-segment and the length sub-segment of each extended segment in the set of extended segments; and
   based on the updated offset sub-segment and the updated length sub-segment of each extended segment, merging each extended segment with another where the extended segments sharing intersections are merged into one new extended segment, and using the number of merged extended segments in the set of extended segments as the new number of the current extended segments.

5. The method for indexing dirty data in the storage system page of claim 1, wherein determining, according to the first storage cost and the second storage cost, whether to index the dirty data in the target storage page by means of the bitmap or the extended segments comprises:
   obtaining a first query cost for indexing the dirty data using the bitmap in the target storage page; obtaining a second query cost for indexing the dirty data using the extended segments in the target storage page based on the number of the current extended segments;
   deriving, according to the first storage cost and the first query cost, a first total cost for indexing the dirty data using the bitmap in the target storage page; deriving, according to the second storage cost and the second query cost, a second total cost for indexing the dirty data using the extended segments in the target storage page; and
   when the first total cost is less than the second total cost, indexing the dirty data in the target storage page by means of the bitmap; and when the second total cost is less than the first total cost, indexing the dirty data in the target storage page by means of the extended segments.

6. The method for indexing dirty data in the storage system page of claim 5, wherein after creating the set of extended segments on the basis of the dirty data distribution information and obtaining the number of the current extended segments and the segment capacity the extended segment in the set of extended segments, the method further comprises:
   updating, when update of the dirty data distribution information is detected, data in the offset sub-segment and the length sub-segment of each extended segment in the set of extended segments; and
   based on the updated offset sub-segment and the updated length sub-segment of each extended segment, merging each extended segment with another where the extended segments sharing intersections are merged into one new extended segment, and using the number of merged extended segments in the set of extended segments as the new number of the current extended segments.

7. The method for indexing dirty data in the storage system page of claim 5, wherein deriving, according to the first storage cost and the first query cost, the first total cost for indexing the dirty data using the bitmap in the target storage page comprises:
   deriving, according to a preset formula, the first storage cost and the first query cost, the first total cost for indexing the dirty data using the bitmap in the target storage page; and
   deriving, according to the second storage cost and the second query cost, the second total cost for indexing the dirty data using the extended segments in the target storage page comprises:
   deriving, according to the preset formula, the second storage cost and the second query cost, the second total cost for indexing the dirty data using the extended segments in the target storage page,
   wherein, the preset formula is Cost=p*Storage+q*Query, in which Cost is a total cost; p is a first preset coefficient; Storage is a storage cost; q is a second preset coefficient; Query is a query cost; and p+q=1, and wherein, the larger the storage capacity of the storage system is, the smaller p is, and the smaller the storage capacity of the storage system is, the larger p is.

8. The method for indexing dirty data in the storage system page of claim 7, wherein after creating the set of extended segments on the basis of the dirty data distribution information and obtaining the number of the current extended segments and the segment capacity the extended segment in the set of extended segments, the method further comprises:
   updating, when update of the dirty data distribution information is detected, data in the offset sub-segment and the length sub-segment of each extended segment in the set of extended segments; and
   based on the updated offset sub-segment and the updated length sub-segment of each extended segment, merging each extended segment with another where the extended segments sharing intersections are merged into one new extended segment, and using the number of merged extended segments in the set of extended segments as the new number of the current extended segments.

9. The method for indexing dirty data in the storage system page of claim 2, wherein after creating the set of extended segments on the basis of the dirty data distribution information and obtaining the number of the current extended segments and the segment capacity the extended segment in the set of extended segments, the method further comprises:
   updating, when update of the dirty data distribution information is detected, data in the offset sub-segment and the length sub-segment of each extended segment in the set of extended segments; and
   based on the updated offset sub-segment and the updated length sub-segment of each extended segment, merging each extended segment with another where the extended segments sharing intersections are merged into one new extended segment, and using the number of merged extended segments in the set of extended segments as the new number of the current extended segments.

10. A device for indexing dirty data in a storage system page, comprising:

an obtaining module (10) configured to obtain a point quantity of storage points in a target storage page in the storage system, and obtain dirty data distribution information of the dirty data in each storage point in the target storage page;

a bitmap creating module (20) configured to create a bitmap on the basis of the point quantity and the dirty data distribution information obtained by the obtaining module (10);

an extended segment creating module (30) configured to create a set of extended segments on the basis of the dirty data distribution information obtained by the obtaining module (10), and to obtain the number of current extended segments and a segment capacity of a extended segment in the set of extended segments;

a cost obtaining module (40) configured to obtain, according to the point quantity obtained by the obtaining module (10), a first storage cost for indexing the dirty data using the bitmap in the target storage page, and obtain, and to obtain, according to the number of the current extended segments and the segment capacity obtained by the extended segment creating module (30), a second storage cost for indexing the dirty data using the extended segments in the target storage page; and an indexing module (50) configured to determine, according to the first storage cost and the second storage cost obtained by the cost obtaining module (40), whether to index the dirty data in the target storage page by means of the bitmap or the extended segments.

11. The device for indexing dirty data in the storage system page of claim 10, wherein the obtaining module (10) is configured to:

obtain a page capacity of the target storage page in the storage system and a point capacity of the storage points in the target storage page, derive the point quantity of the storage points according to the page capacity and the point capacity, and then obtain the dirty data distribution information of the dirty data in each storage point in the target storage page;

wherein, when the storage point is of the dirty data, a corresponding data bit of the storage point in the bitmap is of a positive identifier; when the storage point is not of the dirty data, the corresponding data bit of the storage point in the bitmap is of a negative identifier; and one extended segment in the set of extended segments corresponds to one dirty data segment in the target storage page, each extended segment comprising an offset sub-segment and a length sub-segment; and the extended segment creating module (30) obtaining the segment capacity of the extended segment in the set of extended segments comprises: deriving the segment capacity of the extended segment according to the number of data bits of the offset sub-segment and the length sub-segment.

12. The device for indexing dirty data in the storage system page of claim 10, wherein the indexing module (50) is configured to:

index the dirty data in the target storage page by means of the bitmap when the first storage cost is less than the second storage cost; and index the dirty data in the target storage page by means of the extended segments when the second storage cost is less than the first storage cost.

13. The device for indexing dirty data in the storage system page of claim 12, wherein the extended segment creating module (30) is further configured to:

update, when update of the dirty data distribution information is detected, data in the offset sub-segment and the length sub-segment of each extended segment in the set of extended segments; and merge, based on the updated offset sub-segment and the length sub-segment of each extended segment, each extended segment with another where the extended segments sharing intersections are merged into one new extended segment, and use the number of merged extended segments in the set of extended segments as the new number of the current extended segments.

14. The device for indexing dirty data in the storage system page of claim 10, wherein the indexing module (50) comprises:

a first obtaining unit (51) configured to obtain a first query cost for indexing the dirty data using the bitmap in the target storage page, and obtain, based on the number of the current extended segments, a second query cost for indexing the dirty data using the extended segments in the target storage page;

a second obtaining unit (52) configured to derive, according to the first storage cost obtained by the cost obtaining module (40) and the first query cost obtained by the first obtaining unit (51), a first total cost for indexing the dirty data using the bitmap in the target storage page and derive, and to derive, according to the second storage cost obtained by the cost obtaining module (40) and the second query cost obtained by the first obtaining unit (51), a second total cost for indexing the dirty data using the extended segments in the target storage page; and an indexing unit (53) configured to index the dirty data in the target storage page by means of the bitmap when the first total cost obtained by the second obtaining unit (52) is less than the second total cost, and to index the dirty data in the target storage page by means of the extended segments when the second total cost obtained by the second obtaining unit (52) is less than the first total cost.

15. The device for indexing dirty data in the storage system page of claim 14, wherein the extended segment creating module (30) is further configured to:

update, when update of the dirty data distribution information is detected, data in the offset sub-segment and the length sub-segment of each extended segment in the set of extended segments; and merge, based on the updated offset sub-segment and the length sub-segment of each extended segment, each extended segment with another where the extended segments sharing intersections are merged into one new extended segment, and use the number of merged extended segments in the set of extended segments as the new number of the current extended segments.

16. The device for indexing dirty data in the storage system page of claim 14, wherein the second obtaining unit (52) is configured to:

derive, according to a preset formula, the first storage cost and the first query cost, the first total cost for indexing the dirty data using the bitmap in the target storage page; and derive, according to the preset formula, the second storage cost and the second query cost, the second total cost for indexing the dirty data using the extended segments in the target storage page, wherein, the preset formula is Cost=p*Storage+q*Query, in which Cost is a total cost; p is a first preset coefficient; Storage is a storage cost; q is a second preset coefficient; Query is a query cost; and p+q=1, and wherein, the larger the storage capacity of the storage system is, the smaller p is, and the smaller the storage capacity of the storage system is, the larger p is.

17. The device for indexing dirty data in the storage system page of claim 16, wherein the extended segment creating module (30) is further configured to:
  update, when update of the dirty data distribution information is detected, data in the offset sub-segment and the length sub-segment of each extended segment in the set of extended segments; and
  merge, based on the updated offset sub-segment and the length sub-segment of each extended segment, each extended segment with another where the extended segments sharing intersections are merged into one new extended segment, and use the number of merged extended segments in the set of extended segments as the new number of the current extended segments.

18. The device for indexing dirty data in the storage system page of claim 11, wherein the extended segment creating module (30) is further configured to:
  update, when update of the dirty data distribution information is detected, data in the offset sub-segment and the length sub-segment of each extended segment in the set of extended segments; and
  merge, based on the updated offset sub-segment and the length sub-segment of each extended segment, each extended segment with another where the extended segments sharing intersections are merged into one new extended segment, and use the number of merged extended segments in the set of extended segments as the new number of the current extended segments.

19. A non-transitory computer readable storage medium on which computer executable instructions are stored, wherein when the computer executable instructions are executed by a processor, the method for indexing dirty data in the storage system page of claim 1 is performed.

* * * * *